United States Patent
Forin et al.

(10) Patent No.: US 7,757,224 B2
(45) Date of Patent: Jul. 13, 2010

(54) SOFTWARE SUPPORT FOR DYNAMICALLY EXTENSIBLE PROCESSORS

(75) Inventors: Alessandro Forin, Bellevue, WA (US); Nathaniel L. Lynch, College Station, TX (US); Richard F. Rashid, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1057 days.

(21) Appl. No.: 11/347,723

(22) Filed: Feb. 2, 2006

(65) Prior Publication Data

US 2007/0180434 A1 Aug. 2, 2007

(51) Int. Cl.
*G06F 9/45* (2006.01)
(52) U.S. Cl. .................................................. 717/157
(58) Field of Classification Search ................ 717/159, 717/151, 153
See application file for complete search history.

(56) References Cited

U.S. PATENT DOCUMENTS

| | | | |
|---|---|---|---|
| 5,933,642 A | 8/1999 | Greenbaum et al. | 717/140 |
| 6,077,315 A | 6/2000 | Greenbaum et al. | 717/157 |
| 6,292,934 B1* | 9/2001 | Davidson et al. | 717/158 |
| 6,587,939 B1* | 7/2003 | Takano | 712/210 |
| 6,763,449 B1* | 7/2004 | Sugano et al. | 712/210 |
| 7,013,454 B2* | 3/2006 | Bush et al. | 717/124 |
| 7,526,632 B1* | 4/2009 | Rupp et al. | 712/43 |
| 2004/0103402 A1* | 5/2004 | Bera | 717/132 |
| 2005/0022161 A1* | 1/2005 | Burger et al. | 717/108 |
| 2005/0027971 A1 | 2/2005 | Williams et al. | 717/159 |
| 2005/0049843 A1 | 3/2005 | Hewitt et al. | 716/17 |
| 2005/0160402 A1* | 7/2005 | Wang et al. | 717/114 |
| 2006/0200810 A1* | 9/2006 | McIntosh | 717/140 |
| 2006/0265689 A1* | 11/2006 | Kuznetsov et al. | 717/117 |
| 2007/0143452 A1* | 6/2007 | Suenbuel et al. | 709/220 |
| 2007/0174824 A1* | 7/2007 | Relyea et al. | 717/140 |
| 2007/0198972 A1* | 8/2007 | Hogg et al. | 717/140 |

FOREIGN PATENT DOCUMENTS

WO WO 01/61576 8/2001

OTHER PUBLICATIONS

Aho, M., et al., "Code generation using tree pattern matching and dynamic programming," *ACM Transactions on Programming Languages and Systems*, 1989, 11(4), 491-516.

Arm, Ltd., ARM926EJ-S, *Technical Reference Manual*, 2004, http://www.arm.com/pdfs/DDI0198D_926_TRM.pdf, ii-xxii, 1-1-12-4, Appendix A-B and Index.

Atasu, K., et al., "Automatic application-specific instruction-set extensions under microarchitectural constraints," *In Proc. Of the 40th Design Automation Conference*, 2003, 256-261.

(Continued)

*Primary Examiner*—Anna Deng
(74) *Attorney, Agent, or Firm*—Woodcock Washburn LLP (57) ABSTRACT

A post-compilation tool can rewrite executable images produced by a compiler. The tool can add extension definitions, insert extension-trigger instructions, and add a security signature. Operating system software may be notified of extension capabilities when loading the executable image, and may proceed to load an appropriate processor extension. The operating system software can manage availability of processor extensions on behalf of the applications.

16 Claims, 6 Drawing Sheets

OTHER PUBLICATIONS

Austin, E., et al., "SimpleScalar: An infrastructure for computer system modeling," *IEEE Transactions on Computers*, 2002, 35(2), 59-67.

Bracy, A., et al., "Datafow mini-graphs: Amplifying superscalar capacity and bandwidth," *In proc. Of the 37th Annual International Symposium on Microarchitecture*, 2004, 12 pages.

Brisk, P., et al., "Instruction generation and regularity extraction for reconizable processors," *In Proc. Of the 2002 International Conference on Compilers, Architecture, and Synthesis for Embedded Systems*, 2002, 262-269.

Clark, N., et al., "An architecture framework for transparent instruction set customization in embedded processors," no date available, 6 pages.

Clark, N., et al., "Application-specific processing on a general-purpose core via transparent instruction set customization," *In Proc. Of the 37th Annual International Symposium on Microarchitecture*, 2004, 11 pages.

Clark, N., et al., "Processor acceleration through automated instruction set customization," *In Proc. Of the 36th Annual International Symposium on Microarchitecture*, 2003, 12 pages.

Corliss, M.L., et al., "A programmable macro engine for customizing applications," *In Proc. Of the 30th Annual International Symposium on Computer Architecture*, 2003, 12 pages.

Fisher, J.A., et al., "Trace scheduling: a technique for global microcode compaction," *IEEE Transactions on Computers*, 1981, 30(9), 478-490.

Friendly, D., et al., "Putting the II unit to work: dynamic optimizations for trace cache microprocessors," *In Proc. Of the 25th Annual International Symposium on Computer Architecture*, 1998, 173-181.

Goodwin, D., et al., "Automatic generation of application specific processors," *In Proc. Of the 2003 International Conference on Compilers, Architecture, and Synthesis for Embedding Systems*, 2003, 137-147.

Hwu, W., et al., "The superblock: an effective technique for VLIW and superscalar compilation," *J. of Supercomputing*, 1993, 7, 229-248.

Jacobson, Q., et al., "Instruction pre-processing in trace processors," *In proc. Of the 5th International Symposium on High-Performance Computer Architecture*, 1999, 125-129.

Kunchithapadam, K., et al, "Using lightweight procedures to improve instruction cache performance," *Technical Report CS-TR-1999-1390*, 1999, 1-22.

Lee, C., et al., "A tool for evaluating and synthesizing multimedia and communications systems," *In Proc. Of the 30th Annual IEEE/ACM International Symposium on Microarchitecture*, 1997, 330-335.

Liao, S., et al., "Instruction selection using binate covering for code size optimization," *In Proc. Of the 1995 International Conference on Computer Aided Design*, 1995, 393-399.

Patel, S.J., et al., "replay: hardware framework for dynamic optimization," *IEEE Trans. Comput.*, 2001, 50(6), 590-608.

Phillips, J., et al., "High-performance 3-1 interlock collapsing ALU's," *IEEE Trans. Comput.*, 1994, 43(3), 257-268.

Sassone, P.G., et al., "Dynamic strands: collapsing speculative dependence chains for reducing pipeline communication," *In Proc. Of the 37th Annual International Symposium on Miroarchitecture*, 2004, 11 pages.

Sazeides, Y., et al., "The performance potential of data dependence speculation & collapsing," *In Proc. Of the 29th Annual IEEE/ACM International Symposium on Microarchitecture*, 1996, 238-247.

Sun, F., et al., "Synthesis of custom processors based on extensible platforms," *In Proc. Of the 2002 International Conference on Computer Aided Design*, 2002, 641-648.

Trimaran, An infrastructure for research in ILP, 2000, http://www.trimaran.org, downloaded from the Internet on Apr. 17, 2006, 2 pages.

Yehia, S., et al., "From sequences of dependent instructions to functions: an approach for improving performance without ilp or speculation," *In Proc. Of the 31st Annual International Symposium on Computer Architecture*, 2004, 12 pages.

Yu, P., et al., "Characterizing embedded applications for instruction-set extensible processors," *In Proc. Of the 41st Design Automation Conference*, 2004, 723-728.

\* cited by examiner

```
        b       Exit
        ....
Exit:   lw      ra, 10(sp)
        jr      ra
        addiu   sp,sp,18
OtherCode:
        sw      ra,...
```

*Fig. 4*

```
        b       Exit
        ....
Exit:   ext-1   sp,ra,10
        jr      ra
        addiu   sp,sp,18
OtherCode:
        sw      ra,...
```

*Fig. 5*

```
        b       Exit
        ....
Exit:   ext-1   sp,ra,10
OtherCode:
        sw      ra,...
```

*Fig. 6*

```
        b       Exit
        ....
Exit:   ext-1   sp,ra,10
        lw      ra, 10(sp)
        jr      ra
        addiu   sp,sp,18
OtherCode:
        sw      ra,...
```

*Fig. 7*

```
        b       Exit
        ....
Exit:   BRL     Exit2
OtherCode:
        sw      ra,...
        ....
Exit2:  lw      ra, 10(sp)
        jr      ra
        addiu   sp,sp,18
```

SOFTWARE SUPPORT FOR DYNAMICALLY EXTENSIBLE PROCESSORS

BACKGROUND

While a CPU designer strives for generality, every application program ever produced spends most of its time in a very small portion of the code that comprises its executable file image. This is true of general programs for personal computer use, of programs for embedded computers and even for gaming platforms such as XBOX® made by MICROSOFT® Corporation of Redmond, Wash. Analysis shows that the top two or three basic blocks in the executable file image generally account for well over 80% of the total execution count.

An appealing prospect for a more efficient execution of the program is to optimize the top-running basic blocks with specialized processor instructions with the same semantic of the original sequence of general purpose software instructions but with a much more efficient implementation. Speed-ups reported in the literature range from a factor of two to a factor of six, and in some cases even larger to the tens and over. Our own experience leads us to consider a factor of three as the conservative estimate of the expected speed-up.

The CPU of modem processors implements a well-documented, fixed set of processor instructions. The processor instructions are chosen to capture the largest possible set of application requirements, in the most compact form possible. The CPU is normally realized in fixed logic in such a way that it is impossible to add any new processor instruction once the chip has been produced. On the other hand, Field-Programmable Gate Arrays (FPGA) are an alternative way to implement a CPU that does allow for later extensions and modifications, even after the chip has been deployed in the field.

It is also possible to implement the CPU with fixed logic, but with a dynamically changeable way to interconnect the internal components of the CPU. This approach can lead to new types of processors which we refer to as a "dynamically extensible processors". These processors combine the advantages of fixed logic (reduced size, higher clock rate) with the ability to add processor extensions to the base processor instruction set.

Practical use of an extensible processor should ideally make use of the extended instructions in application programs. Ordinarily, a programmer makes use of an assembler or higher-level language compiler to write the application program. This path can require re-generating a new assembler and a new compiler for each new processor instruction. While certainly possible, this is a rather time-consuming operation. It is also fraught with limitations and dangers. If the program was in fact written in assembler, it must be rewritten. Only high-level language programs can automatically take advantage of the new instructions, provided the compiler is modified to take advantage of them. Furthermore, if we do not have the sources for the compiler, the compiler may be impossible to modify. Compilers are large and complicated programs, so it is very likely that subtle errors will be introduced. Finally, we may not have the sources for the application program or for some crucial library it makes heavy use of.

Existing tools and operating systems are designed for a fixed processor instruction set and are not able to address the needs of a dynamically extensible processor. For example, the XTENSA® processor family manufactured by TENSILICA® Corporation of Santa Clara, Calif., is supported by a standard toolset in the following way: The system designer uses special tools to define one or more processor instructions for a new processor, starting from a base processor design provided by the manufacturer. The main purpose of this tool is to help create a Verilog code for the new extended processor. The tool automatically generates a new compiler and linker based on the manual definition of the new processor instruction. Notice that this procedure is static; it requires the creation of a new chip as well as a new toolset before the application program can be compiled and optimized for it.

The following reference, a copy of which is placed on file with the United States Patent and Trademark Office, provides additional background on the design of customized and extensible processors: Clark, Blome, Chu, Mahlke, Biles, and Flautner, "*An Architecture Framework for Transparent Instruction Set Customization in Embedded Processors.*" The Bibliography section refers to various other papers by the same and other authors that are also generally relevant to the work described herein.

SUMMARY

Systems and methods are provided herein for software support of dynamically extensible processors. A tool can rewrite executable images produced by a compiler. The tool can add extension definitions, insert extension-trigger instructions, and add a security signature. Operating system software may be notified of extension capabilities when loading the executable image, and may proceed to load an appropriate processor extension. The operating system software can manage availability of processor extensions on behalf of the applications. Other advantages and features of the invention are described below.

BRIEF DESCRIPTION OF THE DRAWINGS

The systems and methods for software support for dynamically extensible processors in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
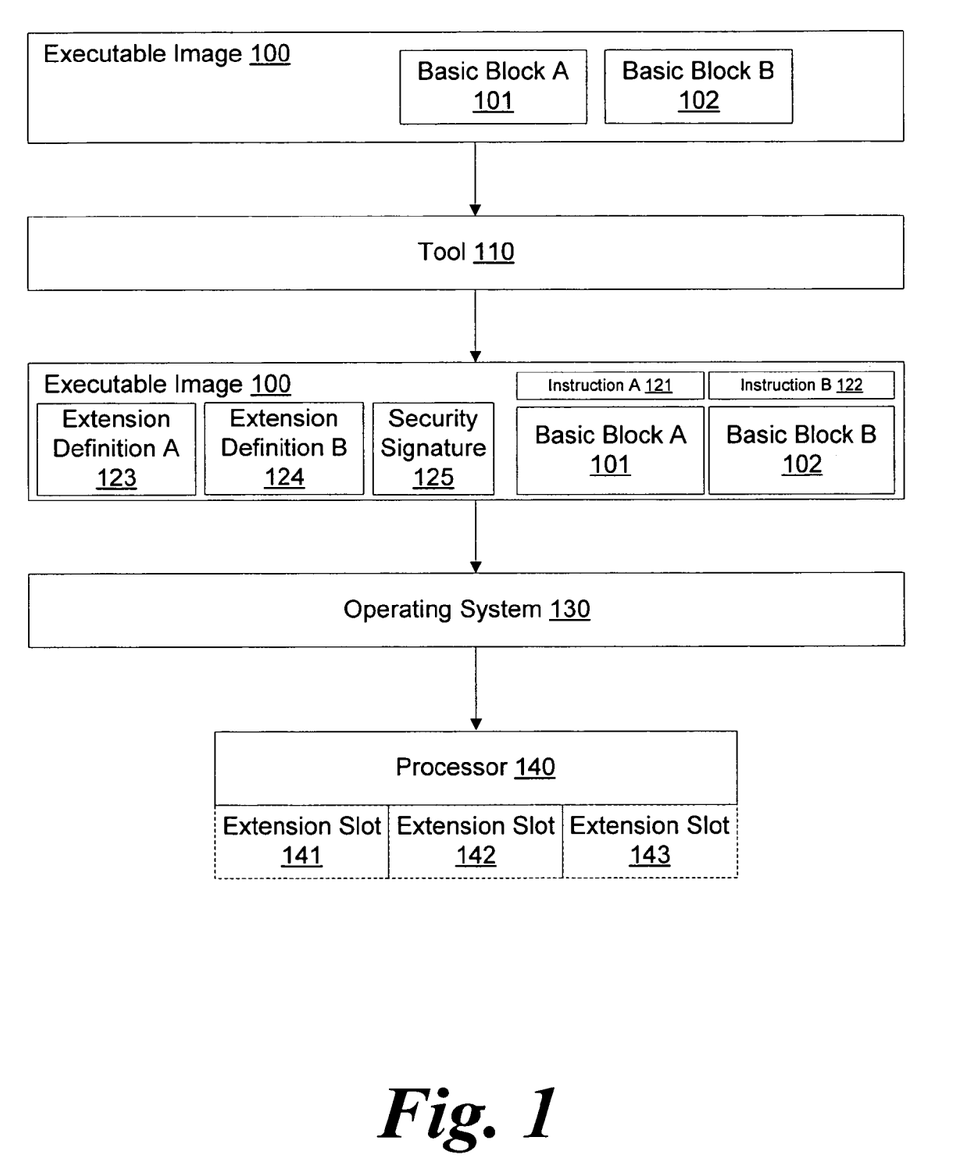
FIG. 1 illustrates an overview of interoperation of various aspects of the invention in which a tool 110 can rewrite an executable image 100 produced by a compiler. The tool 110 can add extension definitions 123, 124, insert extension-trigger instructions 121, 122, and add a security signature 125. Operating system software 130 may be notified of extension capabilities when loading the executable image 100, and may proceed to load the appropriate processor extension, e.g. 123 and/or 124. The operating system software 130 can manage availability of requested processor extensions on behalf of the applications.

FIG. 1 illustrates an overview of interoperation of various aspects of the invention in which a tool 110, also referred to herein as a rewriter tool, can rewrite an executable image 100 produced by a compiler. An executable image is an application or computer program, i.e., a series of machine readable instructions designed to carry out some useful function or set of functions. In general, an application is first written in human readable source code, then the source code is converted into machine language by a number of automated processes, one of which is a compiler.

In one embodiment, the tool 110 is distinct from a compiler that first compiles a particular application. The tool looks at a compiled executable image, identifies basic blocks within the image, and modifies the image by adding extension definitions 123, 124, inserting extension-trigger instructions 121, 122, and adding a security signature 125. Supplementing an image with extension-trigger instructions that cause a processor extension to perform effectively the same functional steps as would have been performed by a basic block enhances efficiency in executing the image.

In other embodiments, the tool 110 may be integrated into a compiler that is capable of identifying basic blocks and appropriately supplementing an executable image with definitions 123, 124, extension-trigger instructions 121, 122, and a security signature 125 as it compiles.

Extension definitions 123, 123 provide or refer to extensions that are used in extending a dynamically extensible processor. There may be a variety of extensible processors developed that use different extension techniques, therefore no particular embodiment of a processor extension or particular extension definition is required. Instead, an extension definition is defined herein as any information that may be used to extend a processor instruction set.

Extension-trigger instructions 121, 121 are instructions that cause a processor extension to execute. Thus, an executable image 100 as modified by tool 110 may comprise both extension definitions 123, 123, that are used by operating system 130 to extend a processor 140, and extension-trigger instructions 121, 121, that cause the corresponding processor extensions to execute.

Security signature 125 generally provides a means for checking that the modifications made to executable image 100 were made by a credible authority, and furthermore that the image has not changed subsequent to such modifications.

Operating system software 130 loads the appropriate extensions, e.g. 123 and/or 124 and manages availability of requested extensions on behalf of the multiple applications. An operating system, as that term is understood in the art, is a software program that, after being initially loaded into the computer by a boot program, manages all the other programs in a computer. The other programs are the various application programs. The application programs make use of the operating system by making requests for services through a defined application program interface (API). In addition, users can typically interact directly with the operating system through a user interface such as a command language or a graphical user interface (GUI).

To support dynamic extension of a processor, operating system software 130 may be notified of extensibility capabilities of executable image 100 at application loading time, either explicitly by the application invoking some API, or implicitly by information contained in the executable file image 100. A security signature 125 can attest to the correctness of the requested extension(s) 123, 124. After checking the security signature, the operating system 130 can load a processor extension as provided by 123 and 124 into a processor extension slot, e.g., 141.

The operating system 130 can manage available processor extensions among multiple applications by keeping track of extension information on a per-process basis, as part of the protected state of the process. Extension information may also be tracked in a more complex multiprocessor setting. The operating system can ensure requested extensions are present and loaded when context-switching between different application programs.

The modified executable image may contain the entire original basic blocks as well as the extension-trigger instructions. This allows non-extensible processors to nonetheless execute modified executable images, simply ignoring the extension-trigger instructions and "falling-through" to the original basic blocks of code. The extensible processor, on the other hand, executes the extension-trigger instructions and "jumps-over" corresponding original blocks of code.

An extensible processor 140 has only a limited number of slots 141, 142, 143 for currently-loaded extensions. The operating system 130 manages these limited resources and can fall-back to the non-optimized cases when the requested extensions exceed the number of available slots 141, 142, 143.

Figure 2:
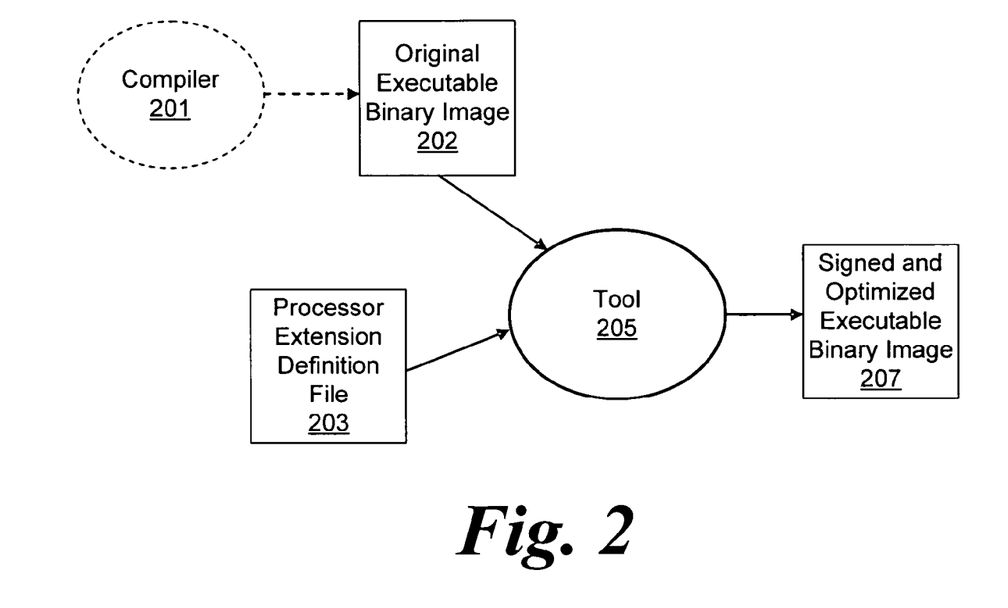
FIG. 2 illustrates a schematic view of the inputs 202, 203, and output 207 of an exemplary rewriter tool 205.

FIG. 2 illustrates a schematic view of the inputs 202, 202, and output 207 of an exemplary rewriter tool 205. The rewriter tool 205 leverages the realization that we should not look at the interesting code as individual instructions but rather as a connected sequence of instructions. In other words, look at code as a set of basic blocks and not as a set of instructions. Barring exceptions and interrupts, a basic block is executed in its entirety before the last instruction branches somewhere else, therefore it is very much like a processor instruction which is executed atomically, all-or-nothing, in all well-defined processors. In case of a basic block, the operating system hides away interrupts and virtual memory faults and only triggers exceptions when something erroneous is taking place.

For the purpose of this discussion, a "basic block" is defined as a linear sequence of machine instructions that ends in a branch instruction. The branch can be conditional or not, subroutine call and returns are branches. There cannot be jumps into the middle of a basic block; it can only be entered on the very first instruction. In case of a jump-into a block we will consider instead two blocks, one each for the two entry points and both terminating at the same branch instruction.

With the now dominant use of higher-level languages and compilers for code generation it becomes even more likely that basic blocks will repeat in actual code. Our analysis shows that if we consider a large set of application programs and look for repeated basic block patterns we will find that on average, each pattern is repeated at least ten times. Some patterns repeat thousands of times.

In one embodiment, tool 205 rewrites executable images 202 produced by a compiler 201 and linker. Tool 201 can be realized by modifying the linker of a regular compiler to perform tool 205 operations, thereby eliminating duplicated work. As shown in FIG. 2, the input to the tool 205 is the original executable program 202 and a processor extension definition file 203. In an alternative embodiment, processor extension definition file 203 may be implemented as a database. Processor extension definition file 203 identifies basic blocks that the tool 205 can search for in an executable image 202. File 203 may also provide the definition and machine readable coding of the extension-trigger instructions which may be used to supplement the image 202 when basic blocks are identified therein.

Finally, file 203 can supply extension definitions that may also be injected into image 202 for use by an operating system in extending a processor. The tool 205 finds basic blocks in the image 202 that match the basic block patterns defined in the definition file 203 and supplements them with new extension-trigger instructions. At a logical level, we can think of the rewriting operation as the act of supplementing a basic block (or a set of basic blocks) with an extension-trigger instruction. "Supplementing" a basic block should be understood as acts including replacing the basic block, replacing a portion of a basic block, or adding to a basic block.

Below is an exemplary instruction extension definition file 203:

```
/* file: patts.bbw */
[bbname return]
MIPSBE
[encoding]
[v1=v0+8]b26.6:c011111;b21.5:r1;b16.5:r2;b0.16:v1;
[code 12]
1000228c
8004000
18002124
[disasm]
lw      r2,10(r1)
jr      r2
addiu   r1,r1,18
[registers 3]
0,29,31
[values 2]
{0,6,10}
{8,6,18}
[bbname __ull_div]
MIPSBE
[encoding]
[r1=r2+1;r3=r0+11;r5=r4+1;r6=r5+1]b26.6:c011110;
b21.5:r4;b16.5:r2;b0.16:v0;
[code 48]
40080100
c21f0200
25082300
40100200
c21f0400
25104300
40200400
```

-continued

```
c21f0500
25208300
2b182600
5000310
40280500
[disasm]
sll     r1,r1,1
srl     r3,r2,31
or      r1,r1,r3
sll     r2,r2,1
srl     r3,r4,31
or      r2,r2,r3
sll     r4,r4,1
srl     r3,r5,31
or      r4,r4,r3
sltu    r3,r1,r6
beq     r0,r3,40
sll     r5,r5,1
[registers 7]
0,9,8,11,4,5,6
[valuess 1]
{40,11,5}
[bbname R_DrawColumnLoop_c]
MIPSBE
[encoding]
[r7=r0+4;r4=r0+5;r3=r0+6;r1=r0+7]b26.6:c011101;
b21.5:r5;b16.5:r6;b11.5:r8;b6.5:r9;b0.6:c000 000;
[code 44]
3140100
7f004230
21106200
4290
21108200
4290
21082500
ffffc624
e2a0
f6ffc814
2138e900
[disasm]
sra     r2,r1,16
andi    r2,r2,7f
addu    r2,r3,r2
lbu     r2,0(r2)
addu    r2,r4,r2
lbu     r2,0(r2)
addu    r1,r1,r5
addiu   r6,r6,-1
sb      r2,0(r7)
bne     r6,r8,0
addu    r7,r7,r9
[registers 10]
0,7,2,6,5,10,3,4,8,9
```

The exemplary file above identifies three instruction patterns, each one being a basic block in canonical form plus some extra information. The first pattern, which is named "return" by the "bbname" opening tag, corresponds directly to the basic block used as a running example in FIGS. 4-8. The other blocks, called "_ull_div" and "R_DrawColumn-Loop_c" are presently considered useful in optimizing an actual application system.

As can be observed, each pattern starts with the "bbname" clause that names the pattern. In this first section it is also specified to which type of processor the patterns belongs to—in this case a Microprocessor without Interlocked Pipeline Stages (MIPS) BigEndian extensible processor. Depending on the implementation, it may be desirable to collect patterns for different processors in a single file.

The "encoding" clause is a string that describes to the rewriter tool how to encode the actual arguments to a specific basic block instance of the pattern into an extension-trigger instruction. The string is divided into two parts, an optional precondition part depicted within angle brackets and a mandatory substitution part.

The precondition can contain multiple clauses, separated by semicolons. Each clause refers either to a register or to a value that is a parameter of the pattern. For instance, in the block "return" the clause specifies the condition that value parameter number 1 "v1" must be equal to value parameter zero "v0", plus eight. Very simple arithmetic expressions may be used that are quickly verified by the rewriter as preconditions, before applying the pattern to a basic block instance. If the preconditions are not met the pattern is not applied. Preconditions on register parameters are of the form "r<n>" and they refer to the register numbers themselves. We can avoid using precious space in the extended instruction if and when some register assignments can be inferred from some other register assignments.

The substitution part of an encoding comprises multiple clauses separated by semicolons. Each clause contains a bit field specification, followed by a colon, followed by an argument selector. The bit field starts with the letter "b", followed by the bit number of the first bit of the field, inclusive. A dot separates the bit field size, in bits, inclusive. The argument selector can be either a register parameter "r<n>" or a value parameter "v<n>", or a binary constant "c<bits>".

The "code" section is the binary representation of the basic block pattern for the processor. The keyword "code" is immediately followed by the size, in bytes, of the binary code that follows. In this exemplary embodiment, each MIPS instruction requires 4 bytes. The "code" section thus provides the binary instructions that the extension replaces.

The "disasm" section is only for the user benefit, as a reminder of what the meaning of the basic block is. Notice that the code here is in "canonical" form, all registers have been renumbered starting at 1.

The "registers" section shows the assignment of actual register numbers found in the actual basic block that was abstracted into this pattern. The register substitution indicated in the first block ("return") will lead directly to the code in FIG. 4. This clause indicates how many registers are specified by the pattern, plus a special case for the MIPS processor who cannot make use of register number zero, it being a special register with a wired value of 0.

The "values" section is used to represent constants in the pattern, which could change from one instantiation to another. Here, each value is a tuple of three elements enclosed in brackets. The first is the byte offset of the instruction that contains the value. The second is a processor-specific code that indicates how the value is encoded. Typically, a value here corresponds to a relocation code used by the linker/loader to modify the instruction when it is moved around in the image file. The third is the actual value itself as found in the original basic block. This entire exemplary file, except for the "encoding" section, can be automatically generated by a separate tool as will be understood by those of skill in the art and which is not further described herein.

The tool 205 will preferably be able to find every sequence of instructions that matches a given instruction pattern. One way to accomplish this pattern matching is as follows, but more sophisticated algorithms are also possible and such variations will be appreciated by those of skill in the art.

The length of the instruction pattern and of the candidate block may be checked first, then three processor-specific analysis steps can be performed. In the first phase, the two blocks are checked for opcode compatibility. A simple implementation might check that the instruction opcodes and opcode qualifiers in the two blocks are the same at the corresponding positions in the block.

The second step checks that the register assignments are compatible. If the instruction pattern contains a canonical register assignment, the check for compatibility may proceed as follows: First, all register assignments for the candidate block are marked as "unused." On each register encounter, identify a register ("register N") assigned to the canonical pattern. The register assigned to the candidate can be referred to as "register M." Next, identify a position of register N in the register assignment for the candidate block. If the position is "unused," the value of register M it can be assigned to it. If instead it has been assigned already, check that the value is still M. If it is not, then the two blocks are not compatible and the check fails.

The third step checks that any constant values embedded in the instruction blocks are compatible. If the instruction pattern indicates a "value" parameter for a given field, then the candidate is free to have any actual value encoded, otherwise the two fields must contain the same values. An example of a value parameter might be a branch offset field, for the frequent case where two blocks only differ in their final branch destination. An example of a constant that must match might be a shift amount, very rarely two sequences of instruction can be matched by simply changing such a field.

In a preferred embodiment, the tool 205 is not a replacement for pre-existing compiler 201 tools. Tool 205 works after the tools of 201 have been applied and the image 202 has been fully optimized according to all the best known optimization techniques. In some embodiments, it may be possible to gain further efficiencies by re-applying the tools of 201 after the tool 205 has done its job.

Figure 3:
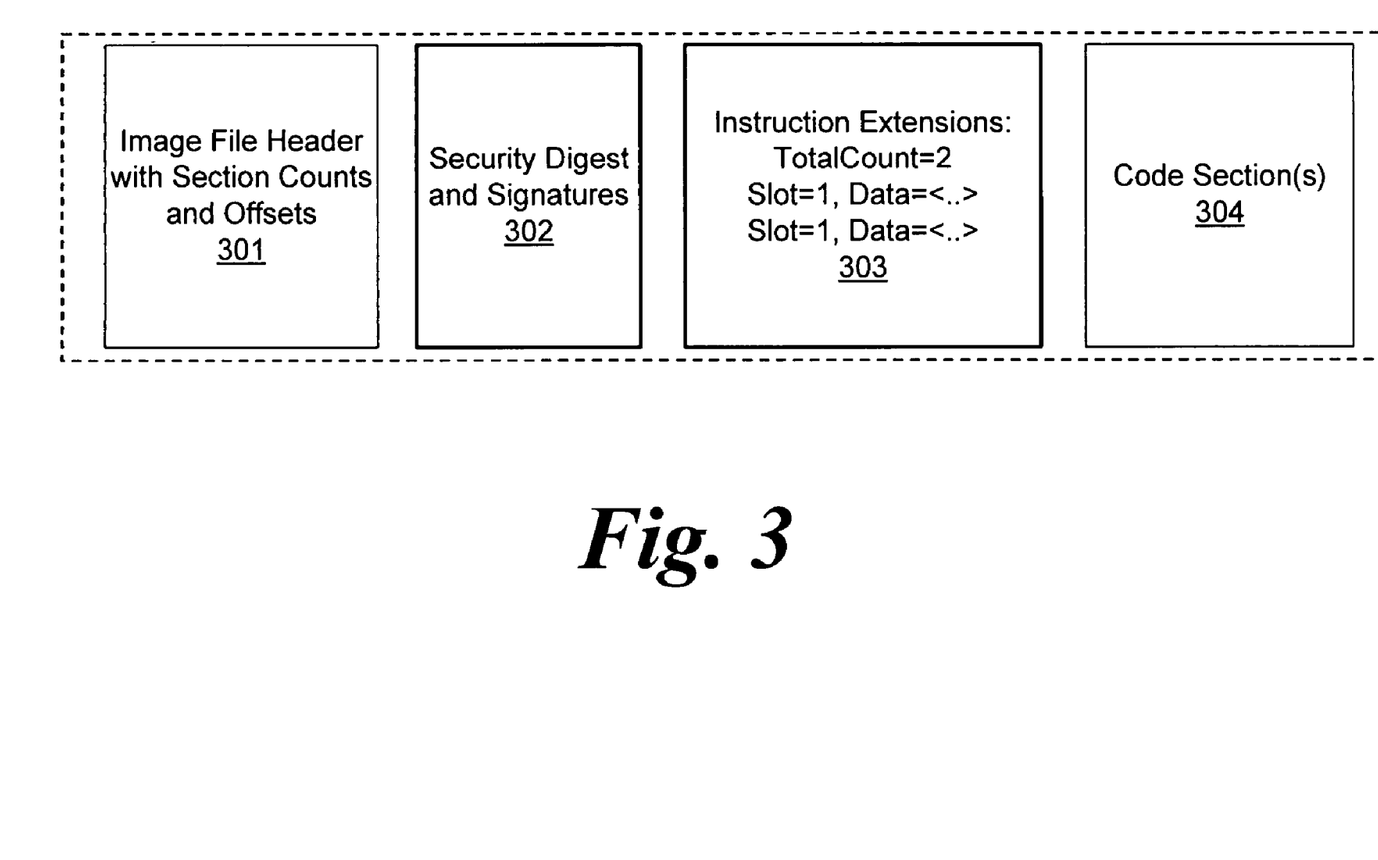
FIG. 3 illustrates an exemplary extended file format for executable images that take advantage of dynamically extensible processors.

A signed, optimized executable binary image 207 may take the form of the extended file format illustrated in FIG. 3. As illustrated, the extended file format may comprise an image file header with section counts and offsets 301, a security digest and signatures section 302, an instruction extensions table 303 (two extensions are illustrated, but there can of course be any number of extensions), and any code section(s) 304.

Figure 4:
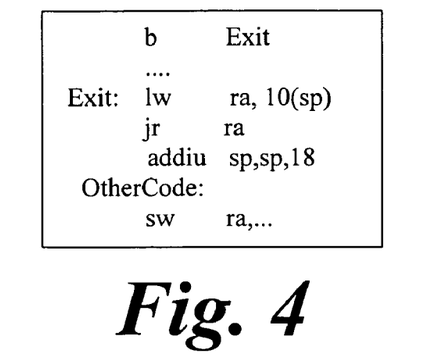
FIG. 4 illustrates an original basic block before the image is supplemented by the rewriter tool.
Figure 5:
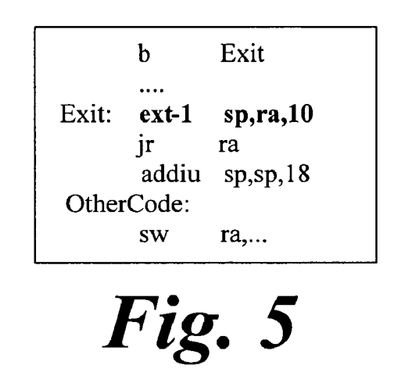
FIG. 5 illustrates an embodiment in which the tool overwrites a first instruction in a basic block with an extension-trigger instruction.
Figure 6:
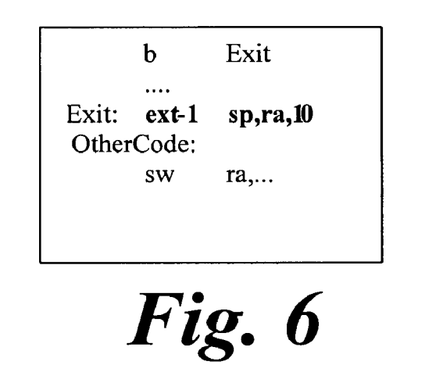
FIG. 6 illustrates an embodiment in which the tool overwrites the first instruction in the basic block with an extension-trigger instruction and removes all the subsequent instructions in the block.
Figure 7:
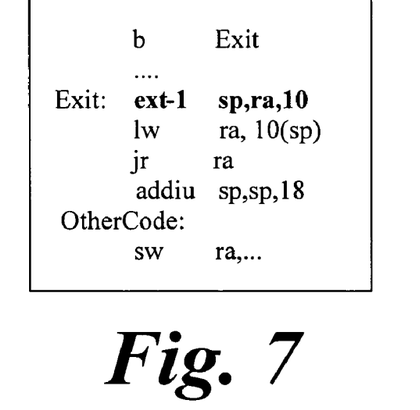
FIG. 7 illustrates an embodiment in which the tool inserts the extension-trigger instruction before the basic block and moves all the remaining instructions in the image up.
Figure 8:
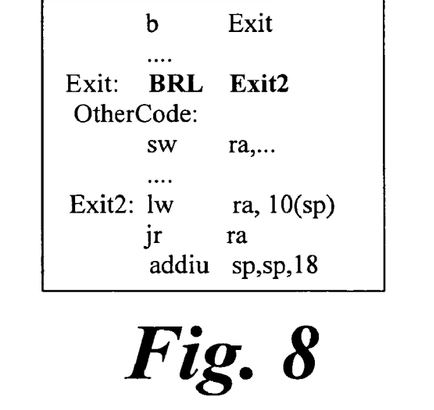
FIG. 8 illustrates an embodiment in which the tool adds a pseudo-branch instruction to the basic block, which is moved elsewhere in the image.

Referring briefly back to FIG. 2, there are at least four ways in which tool 205 can supplement an image 202 with extension-trigger instructions. These various alternative embodiments are illustrated in FIGS. 4-8. FIG. 4 illustrates an original basic block before the image is supplemented by the tool. FIGS. 5-8 illustrate a basic block as supplemented with an extension-trigger instruction. FIG. 5 illustrates an embodiment in which the tool overwrites a first instruction in a basic block with an extension-trigger instruction. FIG. 6 illustrates an embodiment in which the tool overwrites the first instruction in the basic block with an extension-trigger instruction and removes all the subsequent instructions in the block. FIG. 7 illustrates an embodiment in which the tool inserts the extension-trigger instruction before the basic block and moves all the remaining instructions in the image up. FIG. 8 illustrates an embodiment in which the tool adds a pseudo-branch instruction to the basic block, which is moved elsewhere in the image.

In all cases, executing the extension-trigger instruction performs the same semantic actions as the original basic block, and execution will continue exactly where the basic block would have led to. In FIG. 7, for instance, the basic block remains present but it is not executed when the extension-trigger instruction is executed. In FIG. 5, the remaining instructions of the block are similarly not executed when the extension-trigger instruction is executed.

FIG. 8 might be regarded in some way as a special-case of FIG. 7, at least from the point of view of basic block motion and image manipulation. Notice that the use of a branch instruction does not allow us to convey any information to an extensible processor as to what action is desired. In some embodiments, the extensible processor may use this instruction initially as a trigger to initiate a "learning" phase of its auto-extension algorithm. Subsequent execution of the learning-phase trigger instruction at this address can then cause the learned extension to execute instead of the original basic block.

The extended instruction in FIG. 7 encodes three arguments, two registers and a stack offset. We would not be able to convey this information if we used FIG. 8, therefore every block that matches this type of function epilogue would have to be coded separately. In other words, FIG. 8 cannot be reduced to FIG. 6 like FIG. 7 does.

Each solution has advantages and disadvantages. FIG. 5 is efficient and easy to implement, but is not backward compatible with non-extensible processors. FIGS. 6-8 effectively require a full re-linking of the image, changing the relocation information, the symbol tables, etc. Modifying an original linker is one way to implement these solutions. FIG. 6 can reduce the size of the executable image, since on average one extension-trigger instruction replaces a full basic block of at least two and typically many more instructions. Like FIG. 5, it is not backward compatible. FIG. 7 is functionally the richest, it is backward compatible, but it also creates slightly bigger images and it is more difficult to implement.

In some situations FIG. 7 and FIG. 8 may be the only acceptable embodiments. Consider the case of a basic block that contains a number of load and store instructions. To provide the required atomicity, the loads and stores in the replacing extended instruction must either all succeed or all fail. This is not easy to realize in hardware, it can be advantageous for the implementer of the extended instruction to be able to interrupt the execution at the equivalent address of one of the loads/stores. To be fully compatible, this may be the required implementation in some situations, for instance if the load operation causes an exception.

Inserting extension-trigger instructions in application images raises a number of additional considerations. Even though the processor is extensible, we cannot assume that the extension is in fact available at execution time. The only processor instructions that are available with certainty are the ones in the basic set. We shall next consider the following two questions: (1) What happens if the extensions are not loaded and we try to execute an extended instruction? and (2) How can we guarantee that the extensions are loaded and managed properly?

The first question raises considerations which we refer to generally as "backward compatibility". Whether the processor does not have the extension loaded or is not an extensible processor, the executing system must either fail the image or execute it in the same manner as the original, non-optimized image. Failing the image is easy to realize, the extended instructions can be considered illegal instructions and a trap can be generated when they are attempted. This is the most likely outcome on a non-extended processor anyways. But failing the image is not the most desirable outcome in practice, the user (or system) that asked for execution of that image expects it to work as originally intended, despite the fact that not all the required preconditions are met.

If the tool has used the approaches of FIG. 7 or FIG. 8, this can be readily accomplished. The extended instructions can be considered as null instructions (no-op) and execution will fall through (or branch to) the original basic block. A non-extended processor will generate a trap, to avoid performance penalties it is advisable for the operating system to realize what happens and transparently rewrite the offending extended instruction and replace it with a true, non-trapping null instruction. In one embodiment, nullifying a portion of an application that calls for executing a processor extension instruction can be accomplished by changing a value of one or more processor extension control registers. An extensible processor may have this option as well, the operating system might be lazily-evaluating the requirement of loading the extensions and will use this trap as part of his extension-managing algorithm. But it is also advisable that the processor has the option of non-trapping and considering all illegal instructions as null instructions. One way to accomplish this is to provide in hardware a control register that software can use to define the processor behavior in the presence of extension instructions. In other words, software should make the decision to trap or not.

With regard to the second question raised above, there are a number of possible management schemes for handling processor extensions. In some instances the problem could simply be ignored. Consider the case of an embedded system, or the case of a game console. In these cases the set of application programs is either known in advance or strictly controlled. For instance, the manufacturer of the game console has put in place safeguards such that only certified games can be run on the console. The operating system in these cases will load the extension at power-up time and will just assume that the application programs make proper use of the extensions.

In such scenarios, one might ask why are those extensions not part of the base processor instruction set. There are many possible reasons, on a game console the extension(s) could in fact evolve and over time new processor instructions are added but attention is always paid to preserve the old ones. Another reason might be economy of production. A single processor chip is produced in large quantities but it is then customized in different ways depending on its use. This could be rather appealing for embedded systems as the same processor would be optimized in different ways for different systems. If this is the management scheme used then the rewriter tool as described above will suffice.

Another approach that does not require any extra information in the executable file image is to uniquely encode each extended instruction, such that the operating system can automatically identify the required extension when the instruction is first executed, at which time it triggers an illegal instruction trap. The extensions themselves would be provided with/to the operating system by other means. This approach has limitations; guaranteeing uniqueness among unrelated parties such as the various software developers without a central clearinghouse is difficult, and the number of extra opcodes available for encoding extended instructions can be quite limited. Any other management solution requires that the rewriter tool adds some extra information in the executable image.

Figure 9:
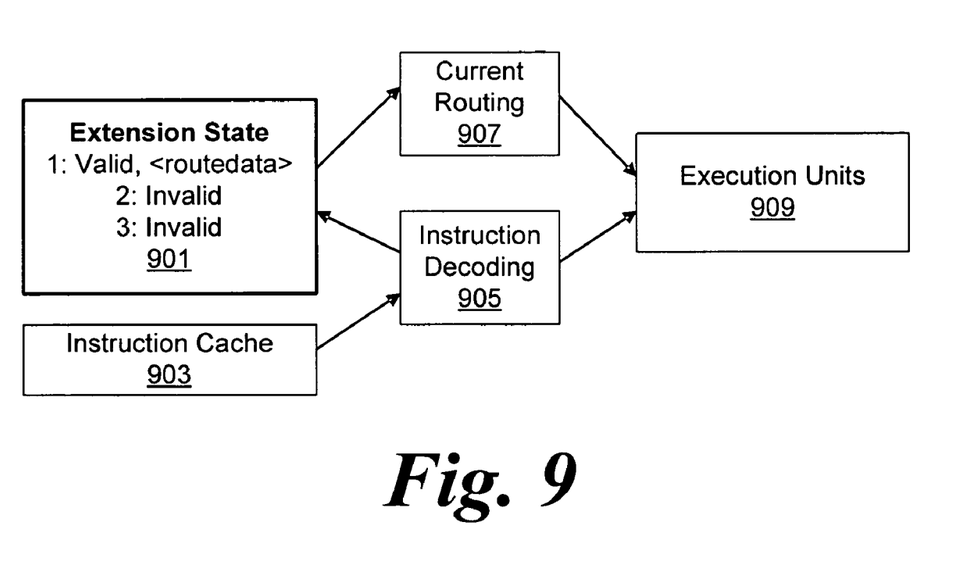
FIG. 9 illustrates an extensible processor with a software visible extension state.

FIG. 9 illustrates an exemplary extensible processor with a software visible extension state. The extensible processor comprises an extension state 901, an instruction cache 903, instruction decoding logic 905, current routing logic 907, and execution units 909. As alluded to above, it is processor-specific what the extension data is and exactly what it does. This invention does not depend on this information other than for illustration purposes. It should be clear that many different processor extension schemes are possible. For instance, the processor of FIG. 9 uses a string of bits to define the routing of data between the internal execution units. This information is indicated with "route-data" in FIG. 9 and FIG. 10.

If properly implemented, the routing data cannot affect the security of the processor and therefore it is not necessary to apply security certificates to the executable image files to ascertain that the image has passed security validation. It is sufficient to insert a table in the image that associates the routing information with the specific extended opcode that uses it, locally to this image. In FIG. 3, the instruction extensions section 303 holds a table with two such extensions, the same routing data indicated generically in FIG. 3 as "Data". Notice that one such image is self-contained and independent of any other image; there is no need to deliver the extension data by other means and the operating system has enough information to be able to handle multiple images concurrently, even though the same instruction opcode has different meanings for different images.

Another extensible processor embodiment might use a binary file that is loaded onto a FPGA as the extension data. The file is in common between many instructions. This type of processor design is such that an extension can perform arbitrary operations on the processor state, and should therefore be certifiably secure. To secure such a processor, an image that wants to make use of an extension can be required to uniquely identify the extension, perhaps with a security certificate. The extension itself can be included in the image as encrypted and signed data.

Figure 10:
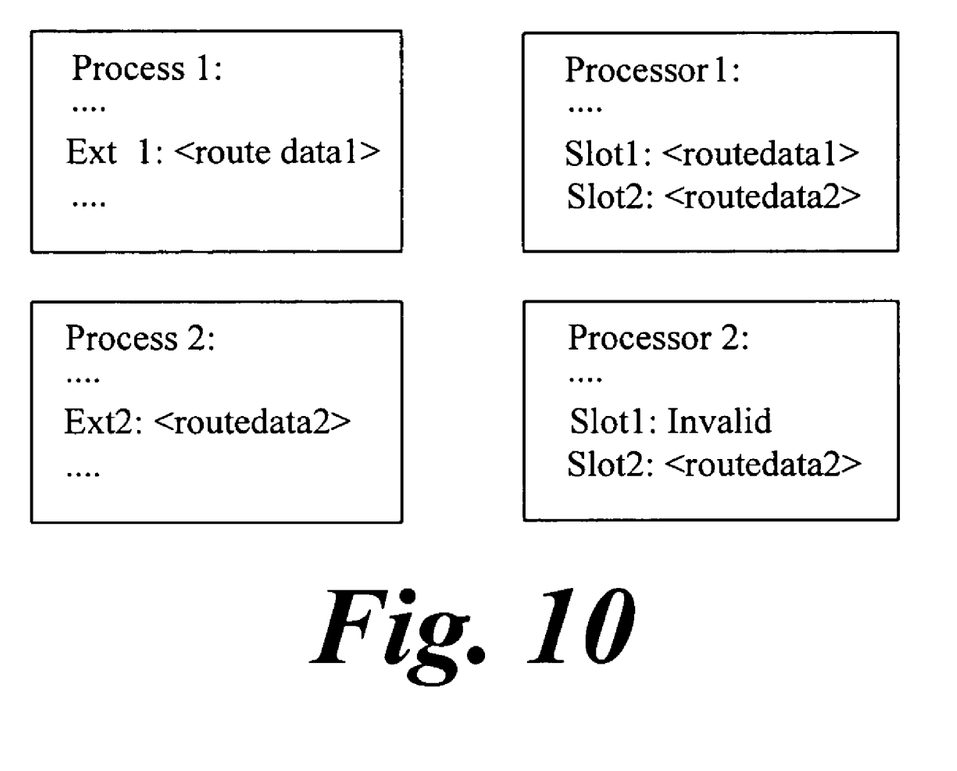
FIG. 10 illustrates a per-process state and a per-processor state for extensible processors in a multiprocessor system configured according to FIG. 9.

In another extensible processor embodiment, the extension is shipped and installed separately, for example as part of an operating system. One advantage of this approach is that it minimizes runtime bookkeeping overhead. With reference to FIGS. 9 and 10, the route-data elements in such embodiments comprise a small identifier for the given extension.

In a final extensible processor embodiment, an extensible processor can be designed in such a way that the extensions cannot create a security threat, as in the first embodiment described herein, but they can still deliver many instruction implementations in a single extension, as in the second embodiment described herein. For this embodiment it is preferable to identify the extension if it is not included with the image. The rewriter tool should add to the executable file image a security digest and signatures section 302 depicted in FIG. 3.

In summary, the rewriter tool inserts extension trigger instructions in the code section of an executable image, and may also add extension definitions and/or extension identifications, and may further add a security signature and digest to the executable file image.

Software support for an application that is loaded on a system comprising a dynamically extensible processor, and that has been rewritten as described above to take advantage of such a processor will now be described in detail. Software support maybe incorporated into an operating system comprising other operating system functionality.

In an exemplary embodiment, the operating system is notified of an application's ability to take advantage of processor extensibility at application loading time. Such notification can be by explicit invocation of some Application Programming Interface (API) call, or can be based on an inference made by the operating system based on information contained in the executable file image as defined in the previous section. Upon notification of extensibility, the operating system can load any appropriate processor extensions into the extensible processor slots.

The operating system can keep track of the extensibility information on a per-process basis, as part of the protected state of the process. FIG. 10 depicts the per-process state that is required for the extensible processor of FIG. 9. It may also be advantageous to keep track of which processor extension is loaded in which slot of the available extensible processors in a multi-processor system, as is also depicted in FIG. 10. This knowledge can be useful, for example if the extension data is relatively large and there are few extensions in use. In this case it might be possible to load extensions from different application programs at the same time. FIG. 10 shows the route-data replicated, which requires potentially expensive comparisons. It is possible to keep the route-data in a separate area and use pointers or indices instead.

The operating system loader can provide processor extensions to the operating system at application launch time. The loader may also help applications share processor extensions. Applications that are created by the rewriter tool using opcodes will generally have opcodes that all start at some value and progress in the same manner. This leads to collisions between opcodes among applications. To avoid this problem, the loader can modify the opcodes in a newly loaded image such that they minimize the conflict with previously loaded images. FIG. 10 shows the effects of this optimization. Because Process-1 and Process-2 use different opcodes they could both be scheduled on Processor-1 without incurring in any management traps, and Process-2 can be scheduled on both processors. If we try to schedule Process-1 on Processor-2 we will instead incur a trap.

An extensible processor has only a limited number of slots for currently-loaded extensions. The actual number could be as small as depicted in FIG. 9 or much larger, but it will always be finite. The operating system can be the arbiter that manages this limited resource on behalf of the application program(s), sharing it in an efficient manner.

This problem is similar to the problem of handling a floating-point coprocessor and the state left in it by multiple application programs. Well known algorithms can be applied here, with one crucial difference. In the floating-point coprocessor case execution cannot proceed unless the coprocessor is made available because (a) there is changeable state left in it and (b) only the coprocessor is capable of executing the floating-point instructions.

In our case, assuming the rewriter tool uses the scheme illustrated in FIG. 7, we are subject to neither of these constraints. Firstly, the application state is held in the general purpose registers and not in a special unit, unless the extension provides extra register state, which is a case we do not further consider as it is similar to the floating-point case. Notice that the route-data is not changeable and does not need to be preserved across context switches. Secondly, the code of the original basic block is still available, therefore the operating system has the option of skipping the extended instructions and simply falling-through to the original code. This is the reason why we prefer the extensible processor to leave it to software to decide whether to trap or not on an extended instruction.

Having the option to continue execution "without the coprocessor" opens the door to new, more elaborate management algorithms. For example, the operating system could (1) exclusively assign the resource to the application that (1a) is observed to make the most use of it or (1b) is selected by a human user; and/or (2) disable all extensions on interrupts, assuming that interrupt service routines will not make use of them, or to guarantee predictable response times; and/or (3) load as many extensions as there are available slots and fall-back to the non optimized basic blocks otherwise; and/or (4) use a least-recently-used algorithm to handle what is effectively a cache of extension data.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A tangible computer-readable storage medium having computer executable instructions stored thereon, the computer executable instructions, comprising:
   identifying during an application loading a processor extension instruction for processing a basic block in the application;
   extending a processor with said processor extension instruction;
   replacing a portion of the application that calls for executing the processor extension instruction, said portion being replaced with a non-trapping null instruction
   nullifying the portion of the application that calls for executing a processor extension instruction by changing a value of one or more processor extension control registers; and
   sharing the processor extension instruction among two or more applications by determining which of the two or more application makes the most use of said processor extension instruction and exclusively assigning the processor extension instruction to one of the two or more applications that is observed to make the most use of said processor extension instruction.

2. The computer-readable storage medium of claim 1, further comprising computer executable instructions for tracking an association between said application and said processor extension instruction.

3. The computer-readable storage medium of claim 2, further comprising computer executable instructions for ensuring that the processor is extended with said processor extension instruction when a context switch is performed.

4. The computer-readable storage medium of claim 1, further comprising computer executable instructions for checking a security signature prior to extending said processor.

5. The computer-readable storage medium of claim 1, further comprising computer executable instructions for tracking the extension slots in a plurality of processors in a multiprocessor system, said slots associated with said processor extension instruction.

6. A tangible computer-readable storage medium having computer executable instructions stored thereon, the computer executable instructions comprising:
   searching an executable file image during loading of the executable file image for at least one linear sequence of machine instructions that ends in a branch instruction, wherein the searching comprising matching a generic template against two or more linear sequences of machine instructions, and wherein said two or more linear sequences of machine instructions differ in at least one instruction field;
   reading a definition file that provides at least one pattern for said at least one linear sequence of machine instructions and at least one corresponding new instruction;
   supplementing said executable file image with said at least one new instruction, wherein said at least one new instruction causes a processor extension instruction representing said at least one linear sequence of machine instructions to execute; and
   sharing the processor extension instruction among two or more applications by determining which of the two or more application makes the most use of said processor extension instruction and exclusively assigning the processor extension instruction to one of the two or more applications that is observed to make the most use of said processor extension instruction.

7. The computer-readable storage medium of claim 6, wherein said instructions for supplementing comprise instructions for overwriting a first instruction in said at least one linear sequence of machine instructions.

8. The computer-readable storage medium of claim 6, wherein said instructions for supplementing comprise instructions for overwriting a first instruction in said at least one linear sequence of machine instructions and removing at least one subsequent instruction in the at least one linear sequence of machine instructions.

9. The computer-readable storage medium of claim 6, wherein said instructions for supplementing comprise instructions for inserting the new instruction before the at least one linear sequence of machine instructions and moving all remaining instructions in the executable file image up.

10. The computer-readable storage medium of claim 6, wherein said instructions for supplementing comprise instructions for adding a pseudo-branch instruction to the at least one linear sequence of machine instructions.

11. The computer-readable storage medium of claim 6, further comprising computer executable instructions for accessing a database that provides the at least one linear sequence of machine instructions and the at least one corresponding new instruction.

12. A method of sharing a processor extension instruction comprising:
   identifying during an application loading the processor extension instruction for processing a basic block in the application;
   extending a processor with said processor extension instruction;
   replacing a portion of the application that calls for executing the processor extension instruction, said portion being replaced with a non-trapping null instruction
   nullifying the portion of the application that calls for executing a processor extension instruction by changing a value of one or more processor extension control registers; and
   sharing the processor extension instruction among two or more applications by determining which of the two or more application makes the most use of said processor extension instruction and exclusively assigning the processor extension instruction to one of the two or more applications that is observed to make the most use of said processor extension instruction.

13. The method of claim 12, further comprising tracking an association between said application and said processor extension instruction.

14. The method of claim 13, further comprising ensuring that the processor is extended with said processor extension instruction when a context switch is performed.

15. The method of claim 12, further comprising checking a security signature prior to extending said processor.

16. The method of claim 12, further comprising tracking the extension slots in a plurality of processors in a multiprocessor system, said slots associated with said processor extension instruction.

* * * * *